United States Patent [19]

De Mets

[11] 4,043,733

[45] Aug. 23, 1977

[54] ENDLESS BELT GUIDE ARRANGEMENT FOR A CONTINUOUSLY OPERATING PRESS

[75] Inventor: Albert De Mets, Roeselaare, Belgium

[73] Assignee: Bison-werke Bahre & Greten GmbH & Co. KG, Germany

[21] Appl. No.: 700,741

[22] Filed: June 29, 1976

[30] Foreign Application Priority Data

July 2, 1975 Germany .......................... 2529540

[51] Int. Cl.² .............................................. B29J 5/00
[52] U.S. Cl. .................................. 425/371; 74/242.8; 100/196
[58] Field of Search ................. 198/813; 100/196; 425/371; 74/242.8, 242.1 R, 242.1 FP

[56] References Cited

U.S. PATENT DOCUMENTS

| 1,418,577 | 6/1922 | Johnston | 198/813 |
| 3,736,089 | 5/1973 | Ross et al. | 425/371 X |
| 3,885,901 | 5/1975 | Reiners | 425/371 |
| 3,887,318 | 6/1975 | De Mets | 425/371 |
| 3,910,179 | 10/1975 | Troutner | 425/371 X |

*Primary Examiner*—Robert L. Spicer, Jr.
*Attorney, Agent, or Firm*—Craig & Antonelli

[57] ABSTRACT

A guide arrangement for endless belts of a continuously operating press which belts are guided by a plurality of rolls arranged on a semi-circular track disposed at the inlet and/or outlet zone of the press and at the upper and/or lower press sections. The respective ends of each of the rolls are pivotally arranged in bearings with each of the bearings being associated with a disk-shaped member fashioned as a half ring. One or both of the disk-shaped members are movable in a controlled manner along a semi-circular track whereby the steel belt is secured against lateral movement.

22 Claims, 5 Drawing Figures

ENDLESS BELT GUIDE ARRANGEMENT FOR A CONTINUOUSLY OPERATING PRESS

The present invention relates to a guide arrangement and, more particularly, to a guide means for drivable endless steel belts associated with a continuously operating press for the manufacture of chip boards and/or fiber boards with the endless steel belts being guided by a plurality of rolls arranged mutually in parallel on a semi-circular track and with each roll having a relatively small diameter, the ends of the respective rolls being supported in two spaced disk-shaped members fashioned as a half-ring.

Continuously operating presses have been proposed, for example, in German utility model 7 208 881 wherein the endless steel belts encompass, in a pretensioned fashion, superimposed endless plate belts which rotate about spaced horizontally disposed axes. The endless plate belts consist of mutually linked plates the mutually facing runs of which are movable in the same direction by means of an upper and/or lower row of at least partially drivable press rolls.

Presses of the aforementioned type, employed as rough presses as well as finishing presses, must of necessity, have relatively long endless plate belts in order to attain the necessary high degree of compacting, so that the time period necessary for curing the binders can be maintained. However, the greater the length of the continuously operating press, the more difficult it is to avoid the lateral straying or displacement of the endless plate belts moved by the drivable pressure rolls. To compensate for such lateral displacements, and to be able to move the chip layer material to be compacted and/or the finished panel web in a straight line, two solutions have been proposed in German Pat. No. 2,220,553. Specifically, in the first solution, for the horizontal adjustment of at least the ends of several superimposed, drivable pressure roll pairs at right angles to their axial extension, sliding elements have been provided, the vertical surfaces of which encompass between them respectively a row of upper and lower bearings as the pressure rolls in a force-derived or pressure mounting mode, wherein the sliding elements are disposed to be movable toward and away from each other in vertical planes and are provided with respectively one inclined surface in opposition to the vertical surfaces. The inclined surfaces are in pressure contact with projections fixedly attached to the press and having corresponding inclined surfaces with the latter inclined surfaces extending obliquely to the vertical in and/or in opposition to the feeding direction of the press.

The second proposal resides in providing several superimposed bearings of an upper row and lower row of drivable pressure rolls, for the horizontal adjustment of at least one of the ends of several superimposed pressure roll pairs at right angles to their axial direction. The bearings are located between sliding beams reciprocable in the horizontal direction with each of the sliding beams being provided with spindles. The spindles are divided into groups with one group of the spindles being able to displace the bearings of the upper pressure rolls and the other group of the spindles being able to displace the bearings of the lower pressure rolls. It was assumed in the proposed solutions that, if the endless plate belts were influenced in such a manner, in order to move the chip layer material to be compacted and/or the finished panel web in a straight line, the endless steel belts encompassing the endless plate belts would also be moved correspondingly, i.e. there would not be any lateral shifting of the endless steel belts. However, it was found that, especially in case of continuously operating finishing presses, lateral displacement of the endless steel belts could not be avoided.

The aim underlying the present invention essentially resides in providing a guide means for endless steel belts in continuously operating presses whereby such belts are guided in such a way that lateral displacement thereof can be compensated for.

According to one feature of the present invention, at least one of two disk-shaped members arranged at the inlet and/or outlet zone and the upper and/or lower press section of the continuously operating press serves for supporting guide rolls of the endless steel belt. The disk-shaped members are secured against lateral movement and either one or both of the disk-shaped members are movably guided along a semi-circular track in a controlled manner.

According to a further feature of the present invention, the guide rolls are of a relatively small diameter with the respective ends of each of the rolls being mounted in bearings associated with the disk-shaped members. The ends of the guide rolls are mounted in the bearings so as to permit pivotal or swinging movement of the rolls with respect to their associated bearings.

It is normally sufficient to control the endless steel belt of the upper press section at the inlet zone in order to be able to compensate for lateral displacements; however, it may be necessary in some instances to guide and move at least one of the disk-shaped members arranged at the outlet zone of the press so as to guide the lower end of the endless steel belt of the upper press section in the same way as one or both of the disk-shaped members arranged at the inlet zone of the press.

By virtue of an analogous displacement of at least one of the disk-shaped members in accordance with the present invention, the guide rolls, arranged mutually in parallel, are shifted more or less obliquely with respect to the advancing direction of the endless steel belt thereby returning the steel belt to its correct position in the event such belt has been laterally displaced.

In accordance with yet another feature of the present invention, in order to reduce the friction of the disk members with respect to a semi-circular track over which such disk members are guided, preferably, each of the semi-circular tracks are fashioned from fixedly mounted rollers with the outer surfaces of the fixedly mounted rollers defining the track along which the disk-shaped member or members are guided.

Since the endless steel belt encompassing the endless plate belt of the lower press section receives the material or chip layer to be compressed which has been poured thereon, is normally substantially larger than the length of the endless steel belt of the upper press section, the steel belt guidance arrangement of the present invention is likewise applicable to the lower press sections both at the inlet and outlet zones thereof.

Accordingly, it is an object of the present invention to provide a guide arrangement for a continuously operating press which avoids by simple means the aforementioned drawbacks and disadvantages encountered in the prior art.

A further object of the present invention resides in providing a guide arrangement for a continuously operating press which compensates for lateral displacements of the endless steel belt of the press.

These and other objects, features, and advantages of the present invention will become more obvious from the following description when taken in connection with the accompanying drawings which shows, for the purposes of illustration only, several embodiments of a guide arrangement in accordance with the present invention, and wherein.

Figure 1:
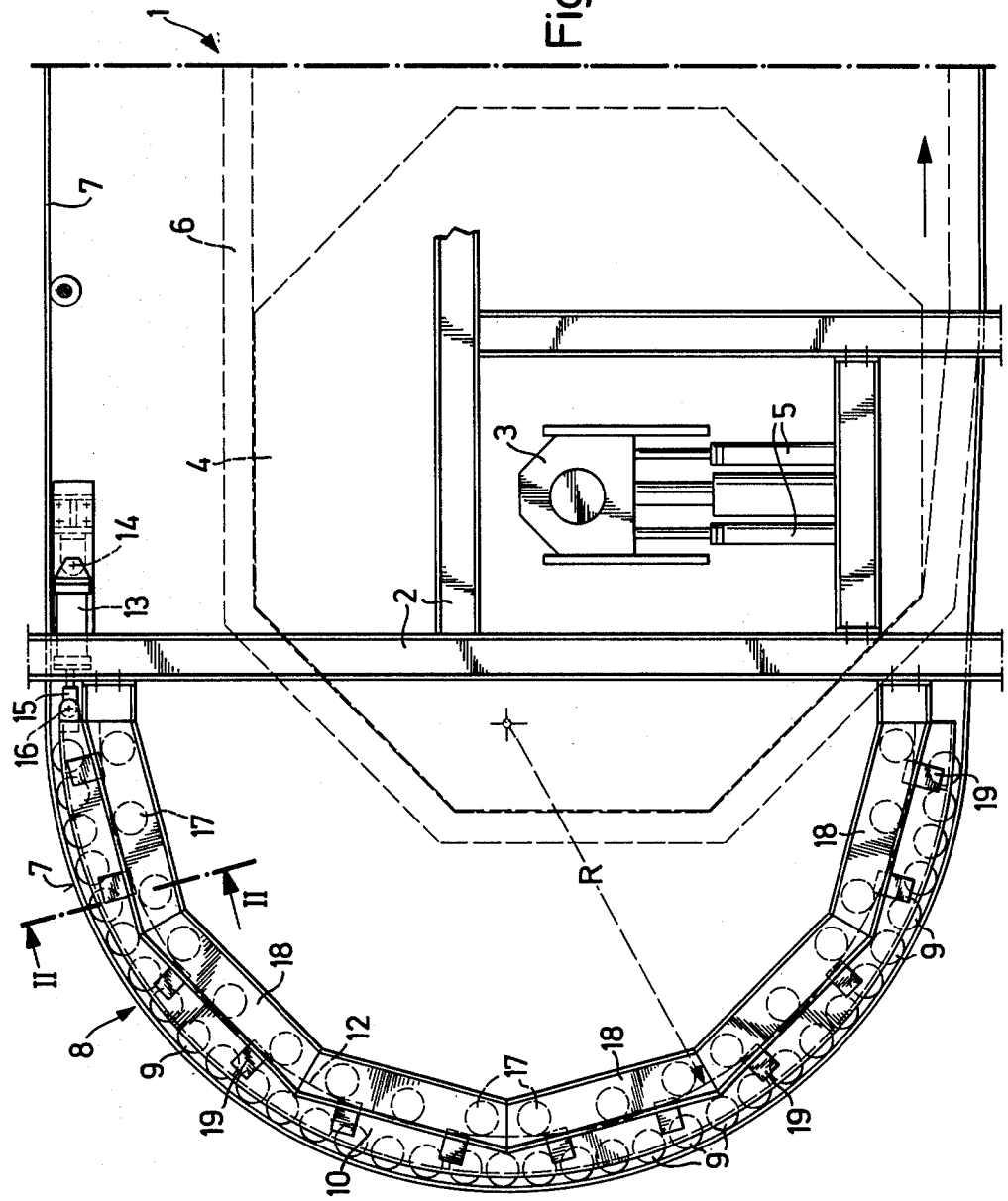
FIG. 1 is a partial side view of an inlet zone of an upper press section of a continuously operating press in accordance with the present invention.

Referring now to the drawings wherein like reference numerals are used throughout the various views to designate like parts and, more particularly to FIG. 1, according to this figure, an upper press section generally designated by the reference numeral 1 of a continuously operating press includes a frame 2 having mounted thereat bearings 3 for rotatably supporting polygonal rolls 4 with the bearing 3 being adjustable by way of a conventional adjusting means 5. While only one polygonal roll 4 at the inlet zone of the press is illustrated, it is understood that a further polygonal roll is provided at the outlet zone of the press with an endless plate belt 6 being guided between such rolls. Likewise, a lower press section (not shown) is also provided and includes spaced polygonal rolls for guidingly displacing a plate belt therebetween.

In the pressing zone of the press, the endless plate belts 6 are influenced by drivable pressure rolls (not shown) which are under the effect of hydraulic cylinders. The drivable pressure rolls may be of conventional construction and of the type disclosed, for example, in German Pat. No. 2,220,553.

An endless steel belt 7 envelopes the endless plate belt 6 of the upper press section with a similar belt (not shown) enveloping the endless plate belt of the lower press section such that the endless steel belts of the upper and lower press sections are interposed between their associated endless plate belt 6 and the material to be pressed so as to directly compress such material.

Guide means generally designated by the reference numeral 8, only one of which is shown, are arranged at the inlet and/or outlet zone of the upper and/or lower press sections with each guide means including a plurality of guide rolls 9 arranged mutually in parallel along a semicircular track 12.

Figure 2:
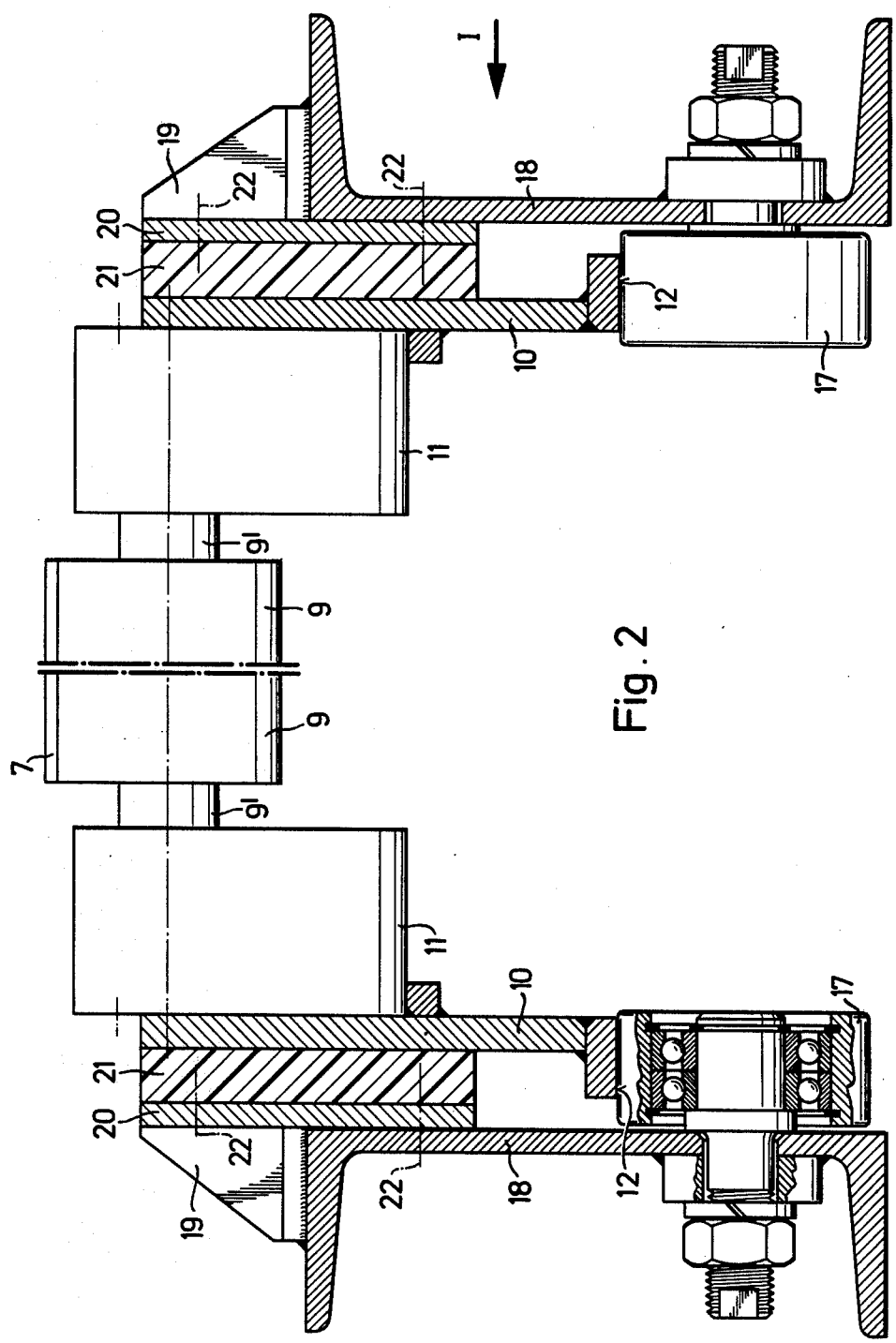
FIG. 2 is a partial cross-sectional view of the guide means taken along line II—II of FIG. 1.

As shown in FIG. 2, each of the rolls 9 have a relatively small diameter with the respective end 9' being supported at two disk or plate-shaped members 10 by way of bearings 11 of conventional construction. The ends 9' are supported in the bearings 11 so that each of the guide rolls 9 can execute swinging or pivotal motions with respect to their associated bearings 11.

While it has been proposed to fixedly associate the disks or plate-shaped members 10 at the press, in accordance with the present invention, one or both of the disk members are arranged at the press so as to be movably guided around an associated semi-circular track 12. To control the movement of either or both of the disk-shaped members 10 along their respective tracks, at least one hydraulic cylinder (FIG. 1) is operatively connected with the respective disk-shaped members 10.

The hydraulic cylinders 13 for the respective disk-shaped members 10 are arranged essentially in alignment. Consequently, only one of the two hydraulic cylinders 13 is visible in FIG. 1 since such cylinder obscures the cylinder associated with the disk-shaped member 10 provided at the other side of the endless steel belt 7. Each of the two hydraulic cylinders are mounted so as to be pivotable about a horizontal axis 14 with the piston 15 of each hydraulic cylinder 13 is pivoted at 16 to one of the two disk-shaped members 10.

As shown most clearly in FIG. 1, each disk-shaped member 10 is in the form of a half-ring with the inwardly disposed side or side facing the polygonal wheels 4 having a semi-circular shape whereby each disk-shaped member is supported by rollers 17 fixably mounted to the respective press sections. The rollers 17 are rigidly connected in a U-shaped profile member 18 so as to form a mounting unit for the disk-shaped members 10. The U-shaped profile members 18 are rigidly joined to the frame 2 by suitable means (not shown). By virtue of the disposition of the axis of rotation of the individual rollers 17 along a semi-circular path, the outer surfaces of the rollers 17 define a semi-circular guide track 12 along which each of the associated disk-shaped members 10 may be movably guided. The axes of the guide rolls 9 as well as the axes of the rollers 17 are arranged along paths which are parallel to the semi-circular track 12 defined by the outer surfaces of the rollers 17. The semi-circular track 12 has a predetermined adjustable or variable radius R.

Since the disks 10 must also be guided in the lateral direction, as shown in FIG. 2, reinforcing flanges 19 and steel plates 20 are arranged in vertical planes and are connected to the U-shaped profiles 18 by suitable fastening means indicated by phantom lines 22. Sliding or anti-friction linings 21 are mounted to the plates 20 to facilitate the movement of the disk-shaped members and the linings 22 may consist, for example, of a synthetic resinous material or another material which has a certain amount of slick or lubricating qualities.

If a lateral displacement of an endless belt 7, for example, the endless steel belt of the upper press section 1 occurs, then at least one of the two hydraulic cylinders is operated, for example, manually so that its associated piston displaces one of the two disk-shaped members in one or the other direction along the semi-circular guide track 12 in order to correctly guide the endless steel belt 7. This control of the hydraulic cylinder 13 provides no difficulties and can be effected without contact, although it is also possible in accordance with the present invention to provide feelers or sensors, for example, equipped with rollers, which are in contact with the lateral surfaces of the corresponding endless steel belt 7 and, upon a transverse motion of the corresponding endless steel belt 7, the feelers or sensors transmit these motions to appropriate hydraulic cylinder or cylinders 13 in order to control the direction of movement of the corresponding piston or pistons 15 of the cylinders 13.

Figure 3:
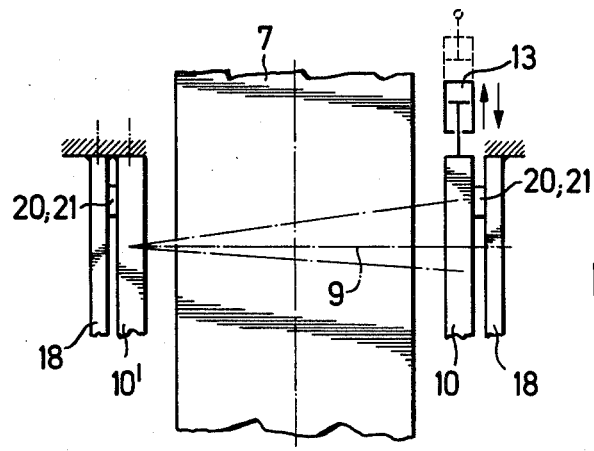
FIG. 3 is a schematic view of a first control arrangement of the present invention with only one disk-shaped member being displaceably guided.

One example of the control of the lateral displacement of the endless steel belt 7 is shown in FIG. 3 wherein only one of the two disk-shaped members of one of the guide means 8 provided that either the inlet or outlet zone of the press is moved to and fro along a semi-circular track by a hydraulic cylinder 13 with the other disk-shaped member 10' being fixedly mounted at the press. While the piston or cylinder 13 may be pivotably mounted at the press, the control arrangement of FIG. 3 could be effected without such pivotal mounting.

Figure 4:
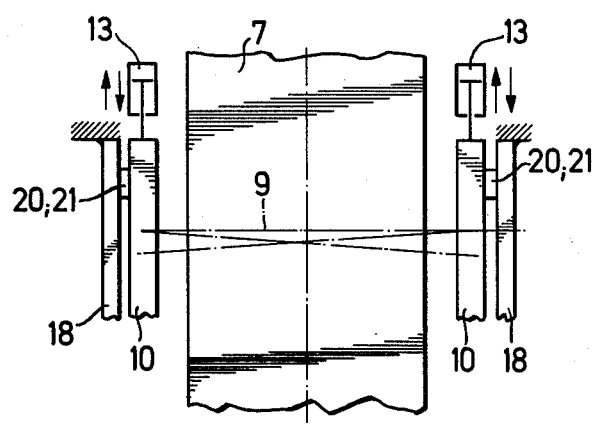
FIG. 4 is a schematic view of a second control arrangement in accordance with the present invention with two disk-shaped members being displaceably guided.

Another example of a control of a lateral displacement of the endless steel belt in accordance with the present invention is shown in FIG. 4. In this arrangement both disk-shaped members 10 of the guide means 8 can be moved to and fro. This construction represents an optimum solution of a control arrangement since the adjustment paths of the disk-shaped members are relatively small.

Figure 5:
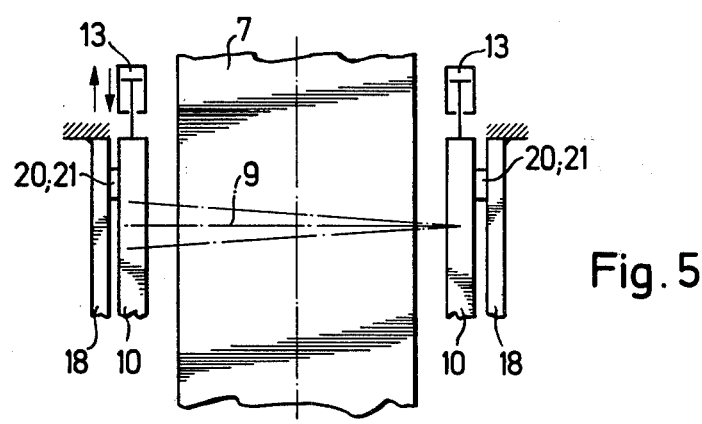
FIG. 5 is a schematic view of a control arrangement according to FIG. 4 with two disk-shaped members, wherein only one disk-shaped member is being displaceably guided.

A still further example of a control of the lateral displacement of endless steel belts is shown in FIG. 5 wherein both disk-shaped members are mounted for movement to and fro in a manner similar to that of FIG. 4; however, in the FIG. 5 construction, only one of the disk-shaped members 10 is displaceably guided.

It is readily apparent the control arrangements of FIGS. 3–5 are applicable to both the inlet and/or outlet zones of the continuously operating press as well as the upper and/or lower press sections.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A guide arrangement for drivable endless belts associated with a manufacturing press which has an inlet zone and an outlet zone, the arrangement comprising: a plurality of guide roll means arranged on the press mutually parallel with respective axes thereof being arranged along a semicircle at at least one of the inlet zone and outlet zone of the press, means arranged on the press at at least one of the inlet zone and outlet zone on respective sides of the endless belt for mounting said guide roll means, and means for selectively controlling displacement of at least one of said guide roll means mounting means along a semi-circular displacement path such that the endless belt is secured against lateral movement.

2. An arrangement according to claim 1, wherein said mounting means includes bearing means for mounting respective ends of each of said guide roll means so as to permit pivotal movement of the respective guide roll means with respect to its associated bearing means.

3. An arrangement according to claim 2, wherein said mounting means further includes a pair of disk-shaped members each arranged on respective sides of the endless band, said bearing means being interposed between said disk-shaped members and a respective end of an associated guide roll means, each of said disk-shaped members being fashioned as a half-ring so as to be provided with a semi-circular surface corresponding to the semi-circular displacement path.

4. An arrangement according to claim 3, wherein said plurality of guide roll means have a relatively small diameter.

5. An arrangement according to claim 3, wherein the manufacturing press is a continuously operating press for the manufacture of at least one of chipboards and fiberboards, and wherein the endless band is an endless steel band.

6. An arrangement according to claim 5, wherein said pair of disk-shaped members are mounted solely at the inlet zone of the press.

7. An arrangement according to claim 6, wherein the semi-circular displacement path of said mounting means is defined by a semi-circular track formed of a plurality of rollers associated with said disk-shaped members and engageable with the semi-circular surfaces thereof for supporting the associated disk-shaped members at the press.

8. An arrangement according to claim 7, wherein one of said disk-shaped members is fixedly mounted at the press, and wherein said means for selectively controlling displacement of the mounting means includes a hydraulic cylinder means operatively associated with the other of said disk-shaped members.

9. An arrangement according to claim 7, wherein both of said disk-shaped members are mounted at the press for displacement along the semi-circular displacement path, and wherein said means for selectively controlling displacement includes a hydraulic cylinder means operatively associated with the respective one of said disk-shaped members.

10. An arrangement according to claim 9, wherein said hydraulic cylinder means associated with each disk-shaped member is independently operable.

11. An arrangement according to claim 9, wherein means are provided for operatively connecting each hydraulic cylinder means whereby both of said disk-shaped members are simultaneously displaced along the semi-circular path.

12. An arrangement according to claim 3, wherein means are provided for laterally guiding the movement of at least one of said disk-shaped members.

13. An arrangement according to claim 3, wherein one of said disk-shaped members is fixedly mounted at the press, and wherein said means for selectively controlling displacement of the mounting means includes a hydraulic cylinder means operatively associated with the other of said disk-shaped members.

14. An arrangement according to claim 3, wherein means are provided for laterally guiding the movement of said other disk-shaped member.

15. An arrangement according to claim 3, wherein both of said disk-shaped members are mounted at the press for displacement along the semi-circular displacement path, and wherein said means for selectively controlling displacement includes a hydraulic cylinder means operatively associated with a respective one of said disk-shaped members.

16. An arrangement according to claim 15, wherein said hydraulic cylinder means associated with each disk-shaped member is independently operable.

17. An arrangement according to claim 16, wherein means are provided for laterally guiding the movement of each of said disk-shaped members.

18. An arrangement according to claim 15, wherein means are provided for operatively connecting each hydraulic cylinder means whereby both of said disk-shaped members are simultaneously displaced along the semi-circular path.

19. An arrangement according to claim 18, wherein means are provided for laterally guiding the movement of each of said disk-shaped members.

20. An arrangement according to claim 1, wherein the manufacturing press includes an upper and lower press section with each press section including an endless band, and wherein said guide roll means, said mounting means, and said displacement controlling means are arranged at the upper and lower press sections and at the inlet and outlet zones thereof.

21. An arrangement according to claim 1, wherein the manufacturing press includes an upper and lower press section with each press section including an endless band, and wherein said guide roll means, said mounting means, and said displacement controlling means are arranged solely at the upper section of the press and solely at the inlet zone therof.

22. An arrangement according to claim 1, wherein the manufacturing press includes an upper and lower press section with each press section including an endless band, and wherein said guide roll means, said mounting means, and said displacement controlling means are arranged solely at the upper press section at the inlet zone and outlet zone thereof.

* * * * *